United States Patent

Baron et al.

[11] 3,935,183
[45] Jan. 27, 1976

[54] INDAZOLE-AZO PHENYL COMPOUNDS

[75] Inventors: Thomas Douglas Baron; Brian Ribbons Fishwick; John Lindley Leng; Michael Yelland, all of Manchester, England

[73] Assignee: Imperial Chemical Industries Limited, London, England

[22] Filed: May 7, 1973

[21] Appl. No.: 357,577

Related U.S. Application Data

[63] Continuation-in-part of Ser. No. 105,100, Jan. 8, 1971, abandoned.

[52] U.S. Cl............................... 260/162; 260/163
[51] Int. Cl.²................... C09B 29/08; C09B 29/26
[58] Field of Search.......................... 260/163, 162

[56] References Cited
UNITED STATES PATENTS
3,360,508   12/1967   Sureau et al................. 260/163

Primary Examiner—Charles F. Warren
Attorney, Agent, or Firm—Cushman, Darby & Cushman

[57] ABSTRACT

A water-insoluble azo dyestuff of the formula:-

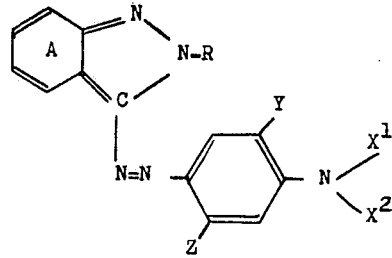

wherein R is lower alkyl; the ring A is unsubstituted or is substituted by chlorine, bromine or nitro; Y is hydrogen, lower alkyl or lower alkoxy; Z is hydrogen, lower alkyl, lower alkoxy, chlorine or a group of the formula —NHCOR$^1$ wherein R$^1$ is lower alkyl; and X$^1$ and X$^2$ are independently selected from hydrogen, lower alkyl, hydroxy lower alkyl, lower alkylcarbonyl lower alkyl, cyano lower alkyl, lower alkoxycarbonyl lower alkyl, lower alkoxy lower alkyl, lower alkylcarbonyloxy lower alkyl, lower alkoxy lower alkoxycarbonyl lower alkyl, cyano lower alkoxy lower alkyl, chloro lower alkyl, phenoxy lower alkyl, phenyl, lower alkylcarbonylamino lower alkyl, cyano lower alkoxycarbonyl lower alkyl and lower alkylcarbonyloxy lower alkoxy carbonyl lower alkyl, a process for the manufacture of the said dyestuff and its use for colouring synthetic textile materials.

1 Claim, No Drawings

INDAZOLE-AZO PHENYL COMPOUNDS

This application is a continuation-in-part application of application Ser. No. 105,100 which was filed in the U.S. Patent Office on 8th Jan. 1971 and which is now abandoned.

This invention relates to water-insoluble azo dyestuffs which are valuable for colouring synthetic textile materials.

According to the invention there is provided a water-insoluble azo dyestuff of the formula:

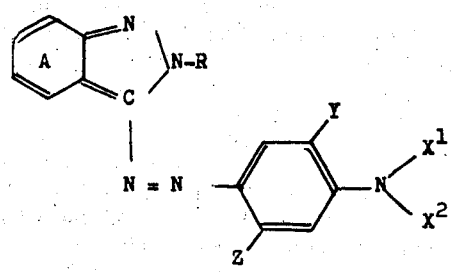

wherein R is lower alkyl; the ring A is unsubstituted or is substituted by chlorine, bromine and nitro; Y is hydrogen, lower alkyl or lower alkoxy; Z is hydrogen, lower alkyl, lower alkoxy, chlorine or a group of the formula —NHCOR$^1$ wherein R$^1$ is lower alkyl; and X$^1$ and X$^2$ are independently selected from hydrogen, lower alkyl, hydroxy lower alkyl, lower alkylcarbonyl lower alkyl, cyano lower alkyl, lower alkoxycarbonyl lower alkyl, lower alkoxy lower alkyl, lower alkylcarbonyloxy lower alkyl, lower alkoxy lower alkoxycarbonyl lower alkyl, cyano lower alkoxy lower alkyl, chloro lower alkyl, phenoxy lower alkyl, phenyl, lower alkylcarbonylamino lower alkyl, cyano lower alkoxycarbonyl lower alkyl and lower alkylcarbonyloxy lower alkoxycarbonyl lower alkyl.

Throughout this Specification the terms "lower alkyl" and "lower alkoxy" are used to denote alkyl and alkoxy radicals respectively containing from 1 to 4 carbon atoms.

As examples of the lower alkoxy radicals represented by Y and Z there may be mentioned methoxy and ethoxy. As examples of the lower alkyl radicals represented by R, Y, Z, R$^1$, X$^1$ and X$^2$ there may be mentioned methyl, ethyl, n-propyl and n-butyl. As examples of the substituted lower alkyl radicals represented by X$^1$ and X$^2$ there may be mentioned hydroxy lower alkyl such as β-hydroxyethyl and β or γ-hydroxypropyl, lower alkylcarbonyl lower alkyl such as β-acetylethyl, cyano lower alkyl such as cyanomethyl and β-cyanoethyl, lower alkoxycarbonyl lower alkyl such as β-(methoxycarbonyl or ethoxycarbonyl)ethyl and ω-ethoxycarbonylbutyl, lower alkoxy lower alkyl such as β-(methoxy or ethoxy)ethyl and γ-methoxypropyl, lower alkylcarbonyloxy lower alkyl such as β-acetoxyethyl, lower alkoxy lower alkoxycarbonyl lower alkyl such as β-(β'-ethoxyethoxycarbonyl)ethyl, cyano lower alkoxy lower alkyl such as β-(β'-cyanoethoxy)ethyl, chloro lower alkyl such as β-chloroethyl and γ-chloropropyl, phenoxy lower alkyl such as β-phenoxyethyl, lower alkylcarbonylamino lower alkyl such as β-acetylaminoethyl and α-acetylaminopropyl, cyano lower alkoxycarbonyl lower alkyl such as β-(β'-cyanoethoxycarbonyl) lower alkyl, and lower alkylcarbonyloxy lower alkoxycarbonyl lower alkyl such as β-(β'-acetoxyethoxycarbonyl) ethyl.

The azo dyestuffs of the invention can be obtained by diazotising an amine of the formula:

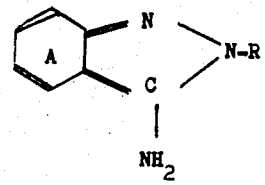

and coupling with a coupling component of the formula:

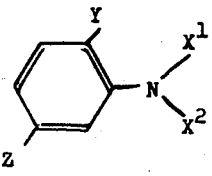

wherein A, R, Y, Z, X$^1$ and X$^2$ have the meanings stated above.

This reaction can be conveniently brought about by adding sodium nitrite to a solution or suspension of the said amine in an inorganic acid optionally containing water, or by adding the amine to nitrosylsulphuric acid, and thereafter adding the resulting solution or suspension of the diazo component to a solution of the coupling component, the pH of the resulting mixture being adjusted as necessary to facilitate the coupling reaction. The resulting dyestuff is then isolated by conventional methods.

The said amines can themselves be obtained by treating the corresponding amine of the formula:

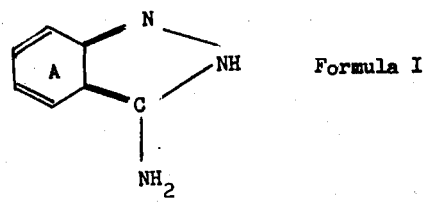   Formula I with a reagent which is capable of converting the NH group in the heterocyclic ring to the NR group, for example by treatment with a dialkylsulphate in nitrobenzene at elevated temperatures. The amines of Formula I can themselves be obtained by reacting the corresponding benzonitrile of the formula:

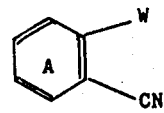

wherein W is methoxy, chlorine or bromine, with a hydrazine to give the corresponding 2-cyanophenylhydrazine of the formula:

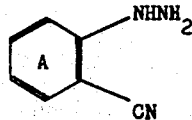

which is then cyclised by heating it in an aqueous solution of hydrochloric acid.

As specific examples of the said amines used to obtain the azo dyestuffs of the invention there may be mentioned 2-methyl-3-amino-5-nitroindazole, 2-methyl-3-amino-5:7-dinitroindazole, 2-methyl-3-aminoindazole, 2-ethyl-3-aminoindazole, 2-methyl-3-amino-5-nitro-7-chloroindazole, 2-methyl-3-amino-5-nitro-7-bromoindazole, 2-methyl-3-amino-4:6-dichlorindazole, 2-methyl-3-amino-5-chloro-7-nitroindazole, and 2-methyl-3-amino-5:7-dibromo-6-methyl-indazole.

As specific examples of the coupling components there may be mentioned N:N-dimethylaniline, N:N-di(β-carbomethoxyethyl)-m-toluidine, N-(γ-methoxypropyl)-3-acetylaminoaniline, N:N-di(β-hydroxyethyl)-2:5-dimethoxyaniline, diphenylamine, N-ethyl-N-(β-cyanoethyl) aniline, N:N-di(β-acetoxyethyl)-m-toluidine and 2-methoxy-5-acetylamino-N-[β-(β'-methoxyethoxycarbonyl)ethyl]aniline.

The azo dyestuffs of the invention are valuable for colouring synthetic textile materials, for example cellulose acetate and cellulose triacetate textile materials, polyamide textile materials such as polyhexamethyleneadipamide textile materials polyacrylonitrile textile materials, and preferably aromatic polyester textile materials such as polyethylene terephthalate textile materials. Such textile materials can be in the form of threads, yarn, or woven or knitted fabric. If desired the said synthetic textile materials can be in the form of blends with other textile materials, for example blends of polyester textile materials with cellulose or woollen textile materials.

Such textile materials can conveniently be coloured with the azo dystuffs, as hereinbefore defined, by immersing the textile material in a dyebath comprising an aqueous dispersion of one or more of the said dyestuffs, which dyebath preferably contains a non-ionic, cationic and/or anionic surface-active agent, and thereafter heating the dyebath for a period at a suitable temperature. In the case of secondary cellulose acetate textile materials it is preferred to carry out the dyeing process at a temperature between 60° and 85°C; in the case of cellulose triacetate or polyamide textile materials it is preferred to carry out the dyeing process at 95° to 100°C; in the case of aromatic polyester textile materials the dyeing process can either be carried out at a temperature between 90° and 100°C., preferably in the presence of a carrier such as diphenyl or o-hydroxydiphenyl, or at a temperature above 100°C., preferably at a temperature between 120° and 140°C., under superatmospheric pressure.

Alternatively, the aqueous dispersion of the said azo dyestuff can be applied to the textile material by a padding or printing process, followed by heating at temperatures up to 230°C depending on the textile material, or by steaming of the textile material. In such processes it is preferred to incorporate a thickening agent, such as gum tragacanth, gum arabic or sodium alginate, into the aqueous dispersion of the said azo dyestuff.

At the conclusion of the colouring process it is preferred to give the coloured textile material a rinse in water or a brief soaping treatment before finally drying the coloured textile material. In the case of aromatic polyester textile materials it is also preferred to subject the coloured textile material to a treatment in an alkaline aqueous solution of sodium hydrosulphite before the soaping treatment in order to remove loosely attached dyestuff from the surface of the textile material.

The azo dyestuffs have excellent affinity and building up properties on synthetic textile materials, and in particular on aromatic polyester textile materials, so enabling deep shades to be obtained. The resulting colouration have excellent fastness to light, to wet treatments, and in particular, to dry heat treatments, and in particular to dry heat treatments such as those carried out at high temperatures during pleating operations.

If desired the azo dyestuffs of the invention can be applied to synthetic textile materials in conjunction with other disperse dyes.

The invention is illustrated but not limited by the following Examples in which the parts and percentages are by weight.

EXAMPLE 1

1.92 Parts of 2-methyl-3-amino-5-nitroindazole (obtained as described in the Journal of the Chemical Society for 1959 at pages 2363–5) are dissolved in 50 parts of 80% phosphoric acid at 0°C., 0.7 part of sodium nitrite is added gradually over 1 hour, and the mixture is stirred for a further 2 hours at 0°C. The resulting mixture is then added to a solution of 3.10 parts of 2-methoxy-5-acetylamino-N-[β-(β'-methoxyethoxycarbonyl) ethyl]aniline dissolved in a mixture of 60 parts of 0.2N aqueous solution of hydrochloric acid and 60 parts of acetone, the temperature of the resulting mixture being maintained at 5°C. by addition of ice as required. The mixture is stirred for 1 hour at 5°C., and the precipitated dyestuff is then filtered off, washed with water and dried.

A solution of the dyestuff in chloroform has a λ max of 577. When dispersed in aqueous media the dyestuff dyes aromatic polyester textile materials in reddish-blue shades of excellent fastness properties.

EXAMPLE 2

In place of the 1.92 parts of the 2-methyl-3-amino-5-nitroindazole used in Example 1 there are used 2.37 parts of 2-methyl-3-amino-5:7-dinitroindazole.

The resulting dyestuff has a λ max of 625 when dissolved in chloroform. When dispersed in aqueous media it dyes aromatic polyester textile materials in bluish-green shades of excellent fastness.

EXAMPLE 3

In place of the 1.92 parts of the 2-methyl-3-amino-5-nitroindazole used in Example 1 there are used 2.37 parts of 2-methyl-3-amino-5:7-dinitroindazole, and in place of the 3.10 parts of the coupling component used in Example 1 there are used 2.06 parts of 3-acetylamino-N:N-diethylaniline or 2.72 parts of 2-methoxy-5-acetylamino-N:N-di(n-propyl)aniline.

The resulting dyestuffs when dissolved in chloroform have λ max at 610 and 662 respectively. When applied to aromatic polyester textile materials from aqueous dyebaths greenish-blue and green shades respectively are obtained.

The 2-methyl-3-amino-5:7-dinitroindazole used in the above examples was itself obtained as follows:

7.0 Parts of a 60% aqueous solution of hydrazine hydrate were added over 30 minutes to a solution of 15.0 parts of 2-methoxy-3:5-dinitrobenzonitrile in 250 parts of ethanol which was stirred at the boil under a reflux condenser. The mixture was then stirred for a further 15 minutes at the boil, cooled to 20°C., and the precipitated 2-cyano-4:6-dinitrophenylhydrazine was filtered off. This solid was stirred at the boil for 30 minutes with 115 parts of a 2N aqueous solution of hydrochloric acid, a solution of 36 parts of sodium acetate cyrstals in 150 parts of water was added, the mixture refluxed for 10 minutes and then cooled to 20°C. when 3-amino-5:7-dinitroindazole separated out and was filtered off.

7.0 Parts of dimethyl sulphate were added over 30 minutes to a stirred mixture of 10 parts of 3-amino-5:7-dinitroindazole and 150 parts of nitrobenzene at 180°C. The mixture was stirred for a further hour at 180°C., and then cooled to 30°C. 200 Parts of diethylether were added and the solid residue separated from the liquid. Crystallisation of the residue from acetone afforded 2-methyl-3-amino-5:7-dinitroindazole of melting point 325°C.

The following Table gives further Examples of disperse azo dyestuffs of the invention which are obtained by diazotising the amines listed in the second column of the Table and coupling the resulting diazo compounds with the coupling components listed in the third column of the Table using methods similar to those described in the previous Examples. The fourth column of the Table lists the shades obtained when the dyestuffs are applied to polyester textile materials.

quent treatment with dimethylsulphate in nitrobenzene.

The 2-(ethyl and n-butyl) -3-amino-5:7-dinitroindazoles were obtained by treating 3-amino-5:7-dinitroindazole with diethylsulphate or di-n-butylsulphate respectively in nitrobenzene.

What we claim is:

1. A water-insoluble azo dyestuff of the formula:

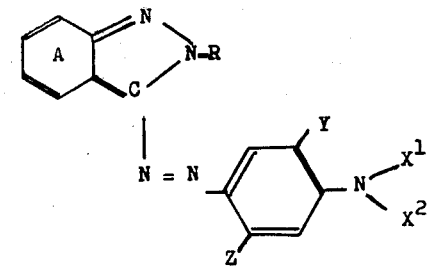

wherein R is lower alkyl; the ring A is unsubstituted or is substituted by chlorine, bromine or nitro; Y is hydrogen, lower alkyl or lower alkoxy; Z is hydrogen, lower alkyl, lower alkoxy, chlorine or a group of the formula —NHCOR$^1$ wherein R$^1$ is lower alkyl; and X$^1$ and X$^2$ are independently selected from hydrogen, lower alkyl, hydroxy lower alkyl, lower alkylcarbonyl lower alkyl,

| Example | Amine | Coupling Component | Shade |
|---|---|---|---|
| 4 | 2-methyl-3-amino-5:7-dinitro-indazole | N:N-di-(β-hydroxyethyl)-m-aminoacetanilide | Blue |
| 5 | do. | N:N-di[β-(β'-cyanoethoxy)ethyl]-m-toluidine | do. |
| 6 | do. | N:N-diethyl-m-toluidine | do. |
| 7 | do. | N:N-di(β-acetoxyethyl)-m-toluidine | Reddish-blue |
| 8 | do. | N:N-diethyl-m-aminoacetanilide | Greenish-blue |
| 9 | do. | N:N-di(β-carbomethoxyethyl)-m-aminoacetanilide | Blue |
| 10 | do. | N-ethyl-N-(β-carbomethoxyethyl)aniline | do. |
| 11 | do. | N:N-diethylaniline | do. |
| 12 | do. | N-ethyl-N-(β-acetoxyethyl)-m-toluidine | do. |
| 13 | do. | N:N-dimethylaniline | do. |
| 14 | 2-ethyl-3-amino-5:7-dinitro-indazole | 2-methoxy-5-acetylamino-N-[β-(β'-methoxyethoxy-carbonyl)ethyl]aniline | Bluish-green |
| 15 | 2-n-butyl-3-amino-5:7-dinitro-indazole | do. | do. |
| 16 | 2-methyl-3-amino-5-nitroindazole | N-ethyl-N-(β-cyanoethyl)aniline | Scarlet |
| 17 | do. | N-(β-cyanoethyl)-N-(β-methoxyethyl)-m-toluidine | Red |
| 18 | do. | N-ethyl-N-(β-acetylethyl)aniline | do. |
| 19 | do. | N-ethyl-N-(α-acetylaminopropyl)aniline | Bluish-red |
| 20 | do. | N-n-butyl-N-(β-cyanoethyl)-m-toluidine | do. |
| 21 | do. | N-ethyl-N-(β-chloroethyl)aniline | Red |
| 22 | do. | N-(β-cyanoethyl)-N-(β-phenoxyethyl)aniline | Scarlet |
| 23 | do. | N-(β-cyanomethyl)-N-[β-(β'-acetoxyethoxy-carbonyl)ethyl]aniline | do. |
| 24 | do. | N-ethyl-N-[β-(cyanomethoxycarbonyl)ethyl]aniline | Red |
| 25 | do. | N-(β-cyanoethyl)-N-(β-acetoxyethyl)aniline | do. |
| 26 | do. | diphenylamine | do. |
| 27 | do. | N:N-di-(β-hydroxyethyl)-m-chloroaniline | do. |
| 28 | do. | 2-methyl-5-methoxyaniline | Rubine |
| 29 | do. | 2:5-dimethoxyaniline | Reddish violet |
| 30 | do. | 2:5-dimethylaniline | Bluish red |
| 31 | do. | 2-methoxy-5-acetylamino-N:N-di(β-acetoxy-ethyl)aniline | Navy blue |
| 32 | 2-methyl-3-aminoindazole | N:N-diethylaniline | Reddish orange |
| 33 | 2-methyl-3-amino-5-nitro-7-chloroindazole | 2-methoxy-5-acetylamino-N:N-di(β-acetoxy-ethyl)aniline | Greenish blue |
| 34 | 2-methyl-3-amino-5-nitro-7-bromoindazole | do. | do. |

The 2-methyl-3-aminoindazole was obtained by reacting 3-aminoindazole with dimethylsulphate in nitrobenzene.

The 2-methyl-3-amino-5-nitro-7-(chloro- or bromo-) indazoles were obtained from 2:3-di(chloro- or bromo-) 5-nitrobenzonitrile by reaction with hydrazine hydrate in ethanol, followed by cyclisation and subsequent cyano lower alkyl, lower alkoxycarbonyl lower alkyl, lower alkoxy lower alkyl, lower alkylcarbonyloxy lower alkyl, lower alkoxy lower alkoxycarbonyl lower alkyl, cyano lower alkoxy lower alkyl, chloro lower alkyl, phenoxy lower alkyl, phenyl, lower alkylcarbonylamino lower alkyl, cyano lower alkoxycarbonyl lower alkyl and lower alkylcarbonyloxy lower alkoxy carbonyl lower alkyl.

\* \* \* \* \*

UNITED STATES PATENT OFFICE
CERTIFICATE OF CORRECTION

PATENT NO. : 3,935,183
DATED : January 27, 1976
INVENTOR(S) : Thomas Douglas BARON ET AL It is certified that error appears in the above-identified patent and that said Letters Patent are hereby corrected as shown below:

IN THE HEADING:

Please add the following

-- [30] Foreign Application Priority Data

January 26, 1970 Great Britain 3585/70 --.

Signed and Sealed this eighteenth Day of May 1976

[SEAL]

Attest:

RUTH C. MASON
Attesting Officer

C. MARSHALL DANN
Commissioner of Patents and Trademarks